(12) United States Patent
Bland (10) Patent No.: US 11,839,179 B1
(45) Date of Patent: Dec. 12, 2023

(54) RAKE

(71) Applicant: Meledey Bland, Ocala, FL (US)

(72) Inventor: Meledey Bland, Ocala, FL (US)

( * ) Notice: Subject to any disclaimer, the term of this patent is extended or adjusted under 35 U.S.C. 154(b) by 827 days.

(21) Appl. No.: 16/922,129

(22) Filed: Jul. 7, 2020

(51) Int. Cl.
*A01D 7/02* (2006.01)
*A01D 7/06* (2006.01)
*A01D 7/10* (2006.01)

(52) U.S. Cl.
CPC ............... *A01D 7/02* (2013.01); *A01D 7/06* (2013.01); *A01D 7/10* (2013.01)

(58) Field of Classification Search
CPC ... A01D 7/02; A01D 7/06; A01D 7/10; A01D 7/00; B25G 3/02; A01B 1/20; E01C 19/44; E04F 21/241
See application file for complete search history.

(56) References Cited

U.S. PATENT DOCUMENTS

| | | | | |
|---|---|---|---|---|
| 1,768,080 A * | 6/1930 | Kurihara | ............. | A01D 76/006 |
| | | | | 56/400.21 |
| 2,098,348 A * | 11/1937 | Mason | .................... | A47L 13/24 |
| | | | | 403/68 |
| 2,790,297 A * | 4/1957 | Gardner | .................. | A01D 7/10 |
| | | | | 56/400.14 |
| 3,374,614 A * | 3/1968 | Dacheux, Jr. | .......... | A01G 20/30 |
| | | | | 56/400.14 |
| D230,127 S * | 1/1974 | Johnson | ........................... | D8/11 |
| 4,351,145 A * | 9/1982 | Farkas | ..................... | A01D 7/00 |
| | | | | D8/13 |
| 4,821,500 A * | 4/1989 | MacIvergan | ............. | A01D 7/00 |
| | | | | 56/400.01 |
| 5,287,935 A * | 2/1994 | Foeller | ...................... | A01B 1/08 |
| | | | | 172/720 |
| 5,357,739 A * | 10/1994 | Nuss | ..................... | E01C 19/264 |
| | | | | 56/400.14 |
| D353,980 S * | 1/1995 | Johnson | ........................... | D8/13 |
| 5,799,996 A * | 9/1998 | Fredrickson | ............. | A01B 1/20 |
| | | | | 294/51 |
| 5,983,616 A * | 11/1999 | Smitherman | ............ | A01B 1/14 |
| | | | | 7/114 |
| 10,499,563 B1 * | 12/2019 | Metcalf | .................. | A63C 19/02 |
| 2006/0236672 A1 * | 10/2006 | Duffy | ...................... | A01D 7/00 |
| | | | | 56/400.04 |
| 2007/0119141 A1 * | 5/2007 | Foss | ........................ | A01D 7/00 |
| | | | | 56/400.16 |

* cited by examiner

*Primary Examiner* — Abigail A Risic
(74) *Attorney, Agent, or Firm* — Kyle A. Fletcher, Esq.

(57) ABSTRACT

The rake comprises a rake head, a handle, and a mini rake attachment. A pair of wheels may be adapted to support the weight of the rake head and to establish a travel height for the rake head. The handle may detachably couple to the rake head and may be adapted to be held by a user such that the user may push or pull the rake head over leaves. A plurality of tines located on the underside of the rake head may force the leaves to move along with the rake head. A handle length and an incidence angle of the handle may be adjustable. The mini rake attachment may couple to the handle in place of the rake head. The mini rake attachment may be operable to move the leaves away from an obstruction where the rake head does not fit.

18 Claims, 7 Drawing Sheets

RAKE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of yard tools, more specifically, a rake.

SUMMARY OF INVENTION

The rake comprises a rake head, a handle, and a mini rake attachment. A pair of wheels may be adapted to support the weight of the rake head and to establish a travel height for the rake head. The handle may detachably couple to the rake head and may be adapted to be held by a user such that the user may push or pull the rake head over leaves. A plurality of tines located on the underside of the rake head may force the leaves to move along with the rake head. A handle length and an incidence angle of the handle may be adjustable. The mini rake attachment may couple to the handle in place of the rake head. The mini rake attachment may be operable to move the leaves away from an obstruction where the rake head does not fit.

An object of the invention is to rake leaves by moving the leaves using a plurality of tines located on the bottom of a rake head.

Another object of the invention is to provide a pair of wheels to support the weight of the rake and to establish a travel height for the rake head.

A further object of the invention is to provide a mini rake attachment to move leaves that are located near an obstruction.

Yet another object of the invention is to provide a handle that may be adjusted in length and may couple to either the rake head or to the mini rake attachment.

These together with additional objects, features and advantages of the rake will be readily apparent to those of ordinary skill in the art upon reading the following detailed description of the presently preferred, but nonetheless illustrative, embodiments when taken in conjunction with the accompanying drawings.

In this respect, before explaining the current embodiments of the rake in detail, it is to be understood that the rake is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rake.

It is therefore important that the claims be regarded as including such equivalent construction insofar as they do not depart from the spirit and scope of the rake. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 7.

The rake 100 (hereinafter invention) comprises a rake head 200, a handle 250, and a mini rake attachment 280. A pair of wheels 230 may be adapted to support the weight of the rake head 200 and to establish a travel height 236 for the rake head 200. The handle 250 may detachably couple to the rake head 200 and may be adapted to be held by a user such that the user may push or pull the rake head 200 over leaves 900. A plurality of tines 210 located on the underside of the rake head 200 may force the leaves 900 to move along with the rake head 200. A handle length 270 and an incidence angle 272 of the handle 250 may be adjustable. The mini rake attachment 280 may couple to the handle 250 in place of the rake head 200. The mini rake attachment 280 may be operable to move the leaves 900 away from an obstruction where the rake head 200 does not fit.

Figure 1:
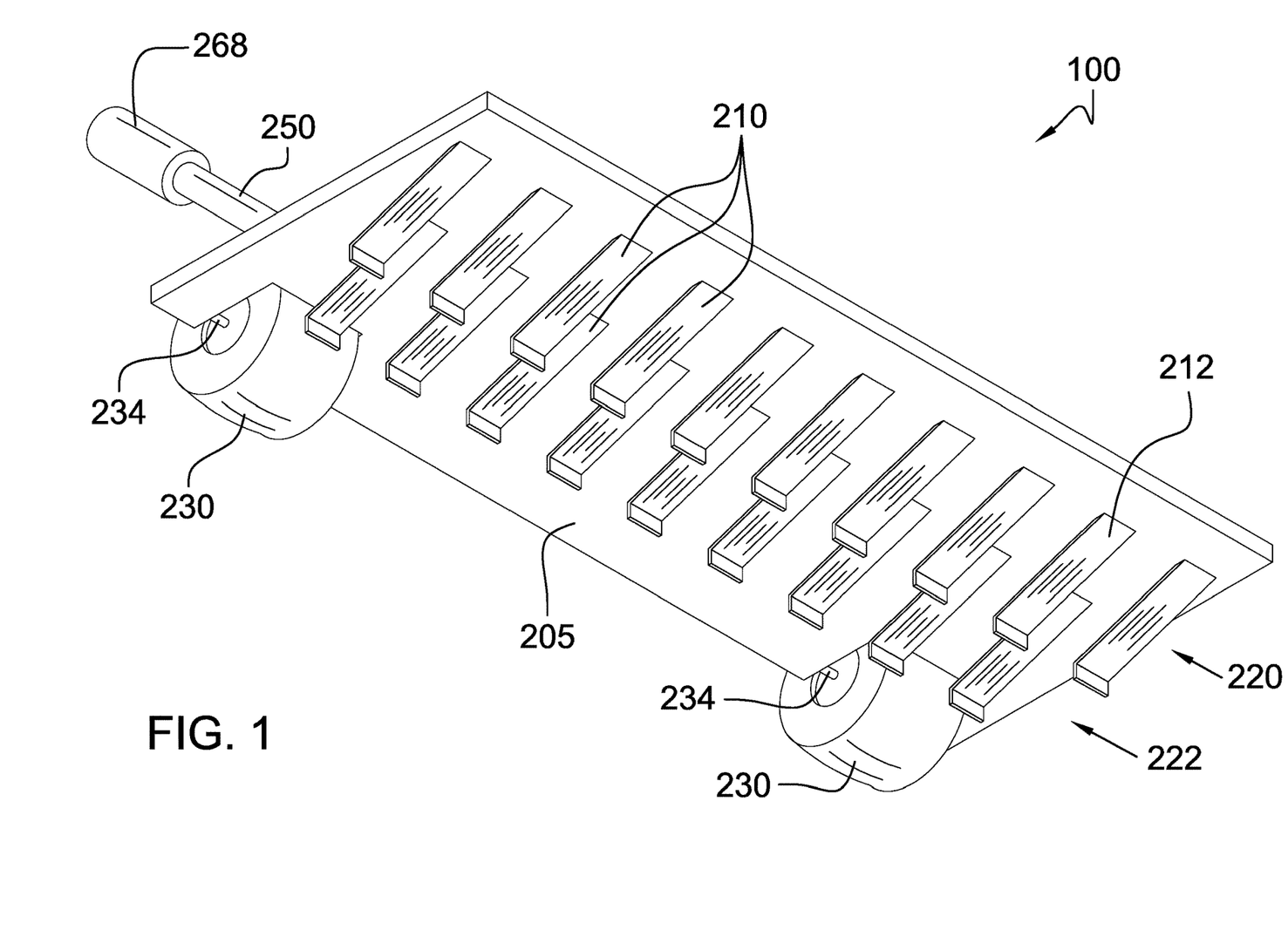
FIG. 1 is a bottom isometric view of an embodiment of the disclosure.
Figure 5:
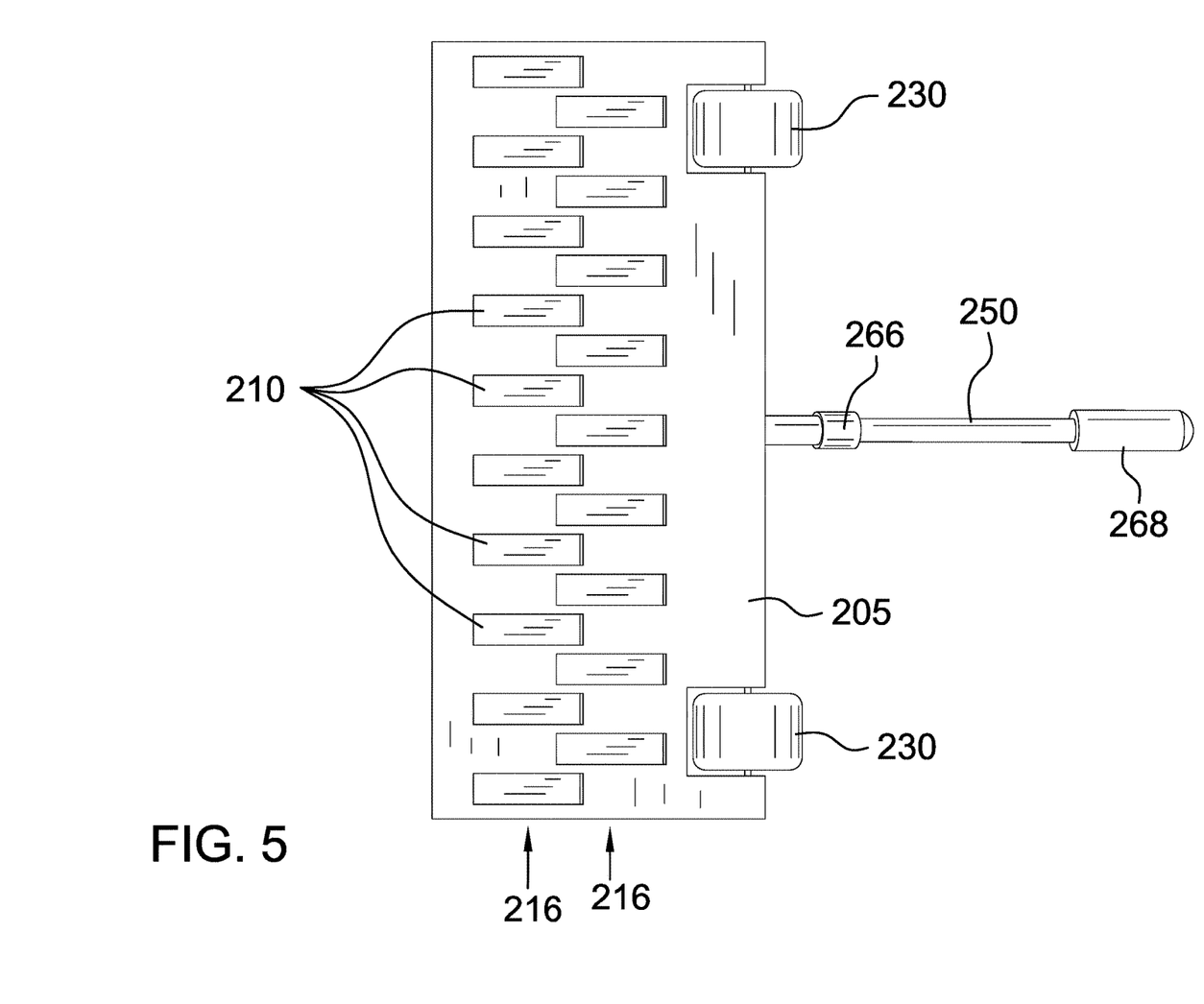
FIG. 5 is a bottom view of an embodiment of the disclosure.

The rake head 200 may comprise a base plate 205, the plurality of tines 210, the pair of wheels 230, and a handle bracket 240. The base plate 205 may be a structural support for the plurality of tines 210, the pair of wheels 230, and the handle bracket 240. The plurality of tines 210 may be dispersed over the bottom of the base plate 205. An individual tine 212 selected from the plurality of tines 210 may be a projection from the bottom of the base plate 205 that is oriented at an oblique angle relative to the base plate 205. The individual tine 212 may bend downward at a point that is more than one half of the length of the individual tine 212 away from the base plate 205.

The plurality of tines 210 may be oriented in the same direction. As a non-limiting example, all of the plurality of tines 210 may project downwards and towards the pair of wheels 230. In some embodiments, the plurality of tines 210 may be of uniform length such that the distal end of the individual tines 212 may touch ground 910 when the base plate 205 is horizontal to the ground 910 with the pair of wheels 230 resting upon the ground 910.

The plurality of tines 210 may be organized into two or more rows. An individual row 216 selected from the two or more rows may be a grouping of the individual tines 212 that are equidistant from the front end of the base plate 205. The individual tines 212 comprising the individual row 216 may be dispersed along the individual row 216 with equidistant lateral spacing.

In some embodiments, the two or more rows may be staggered such that the individual tines 212 comprising a first row 220 are laterally misaligned compared to the individual tines 212 comprising a second row 222 that is adjacent to the first row 220.

Figure 3:
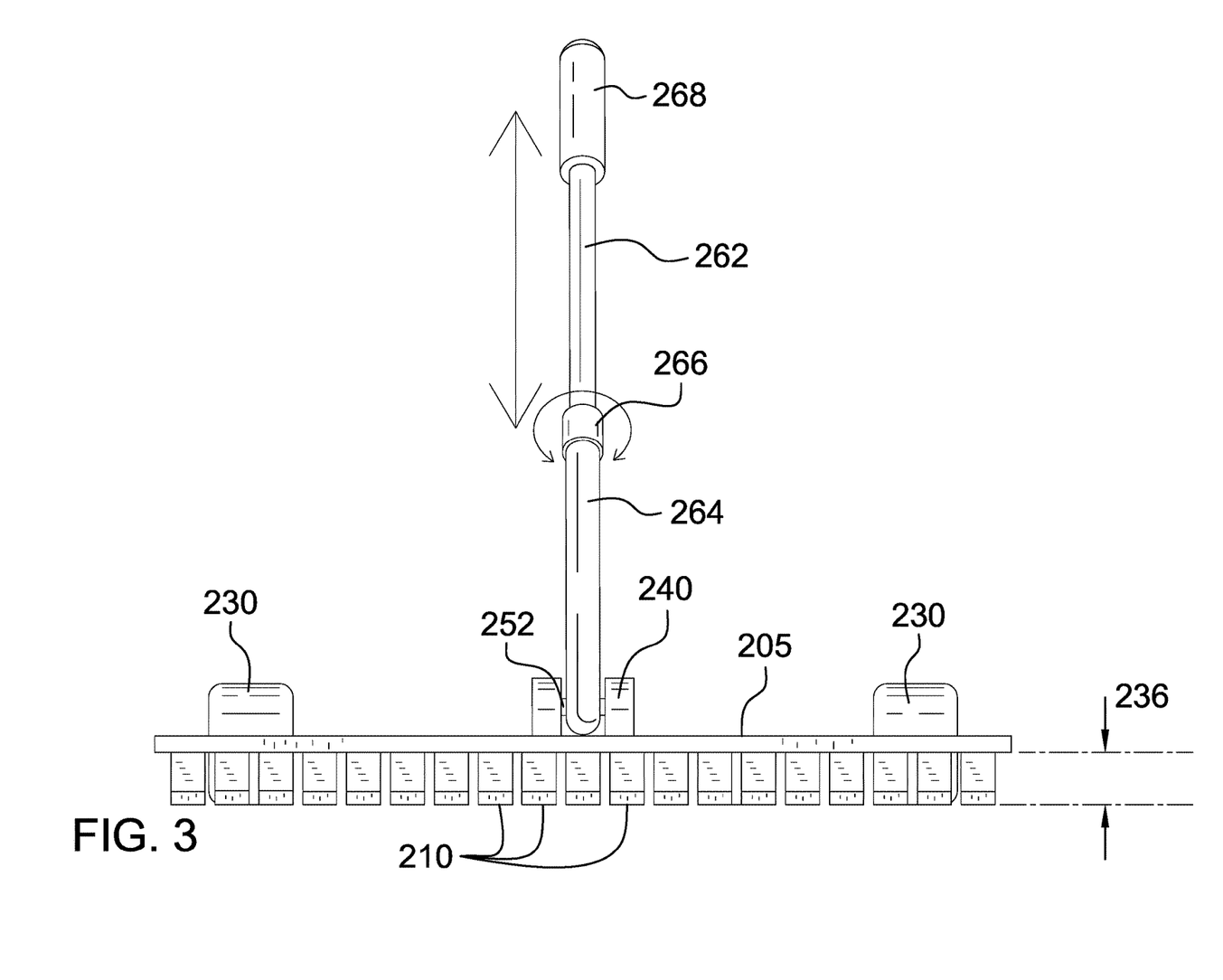
FIG. 3 is a front view of an embodiment of the disclosure.
Figure 4:
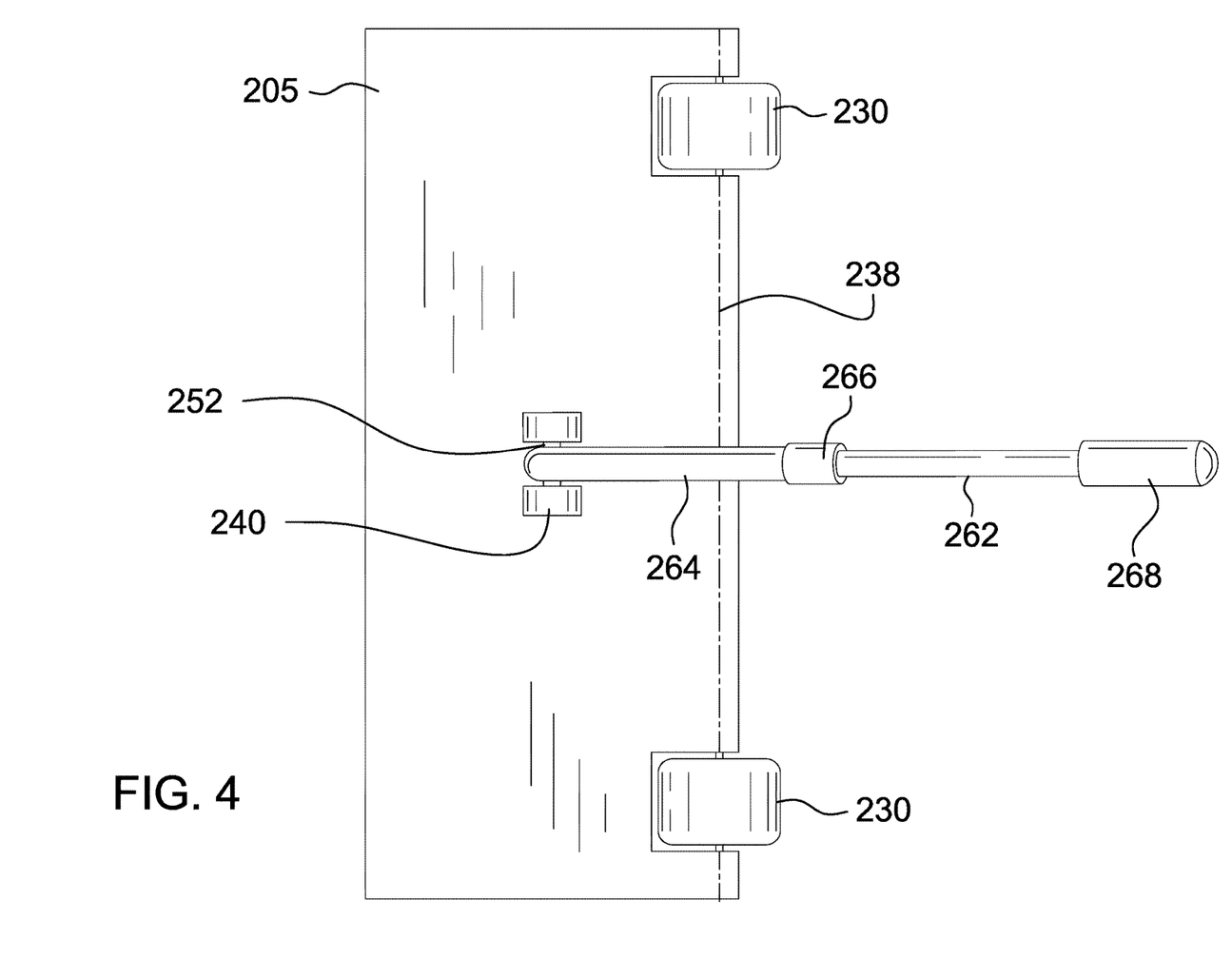
FIG. 4 is a top view of an embodiment of the disclosure.

The pair of wheels 230 may reduce friction between the invention 100 and the ground 910. The pair of wheels 230 may establish the travel height 236 for the base plate 205. The pair of wheels 230 may be coupled to the rear of the base plate 205 and may rotate around a common rotational axis 238. An axle 234 of each of the pair of wheels 230 may be coupled to the base plate 205. The axle 234 may be aligned with the common rotational axis 238.

Figure 6:
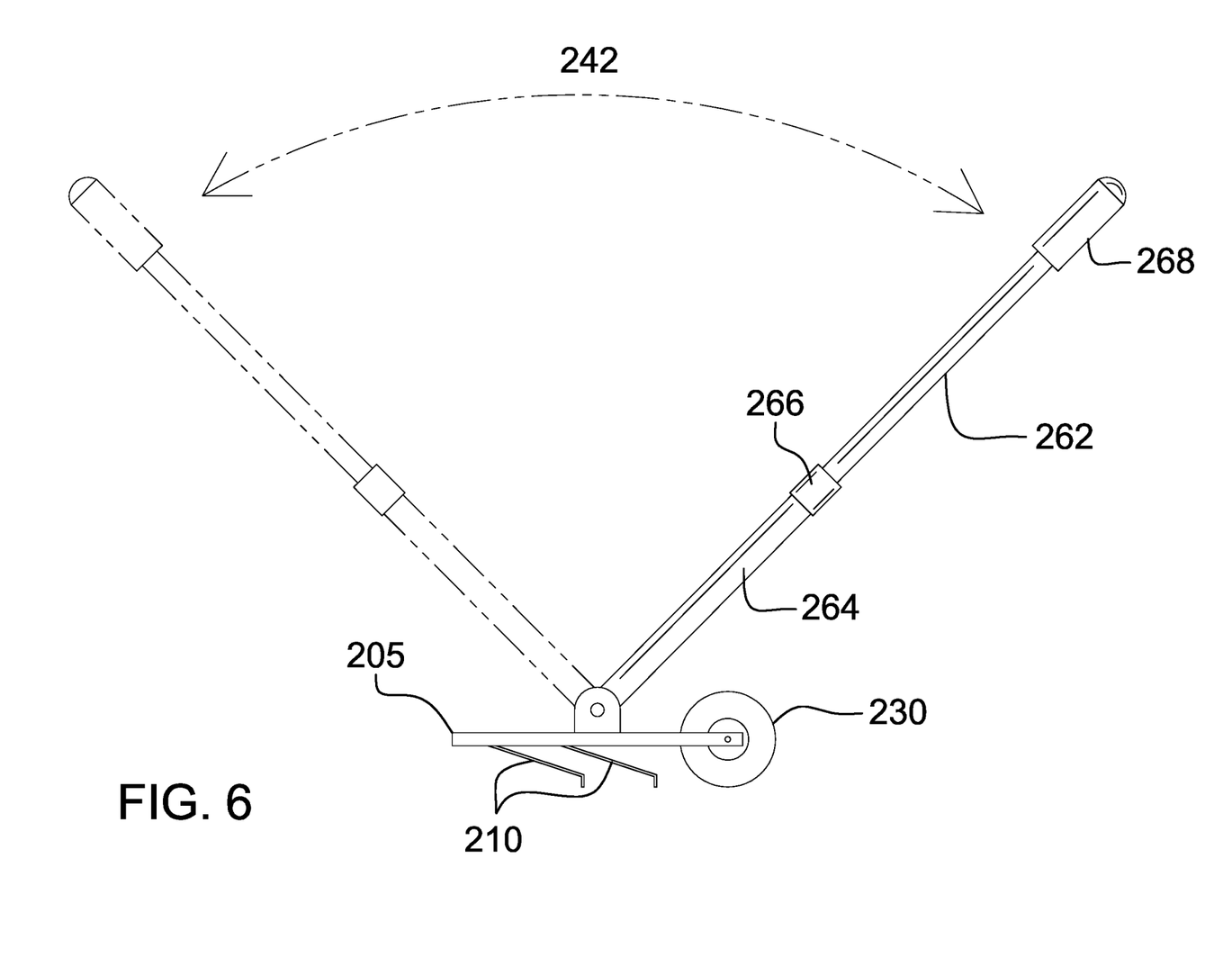
FIG. 6 is a detail view of an embodiment of the disclosure illustrating the adjustable incidence angle of the handle.

The handle bracket 240 may couple the handle 250 to the base plate 205. The handle 250 may pivot 242 front to rear such that the invention 100 may be pushed from behind or pulled from the front.

Figure 2:
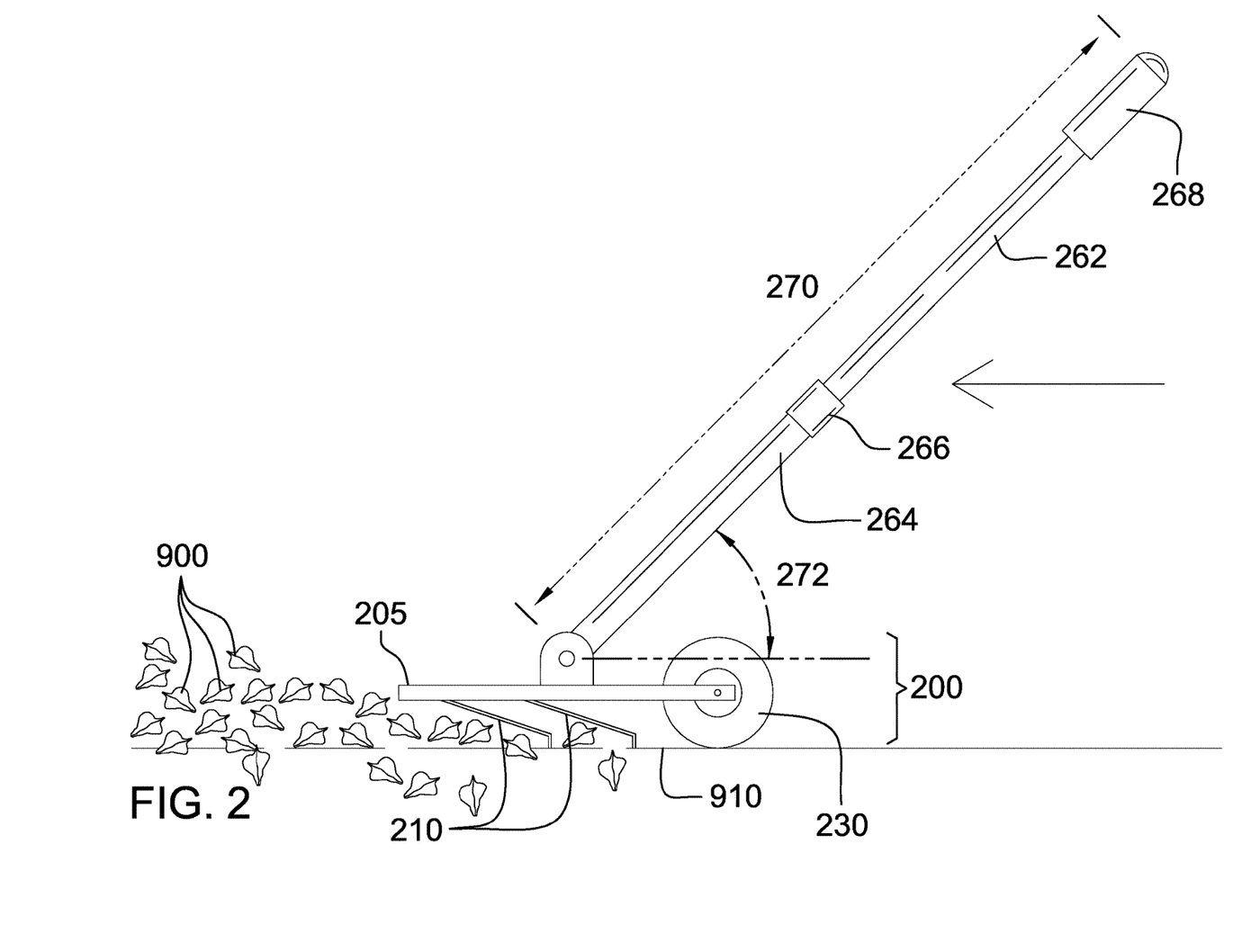
FIG. 2 is an in-use view of an embodiment of the disclosure.

The handle 250 may be adapted to be held by the user while operating the invention 100. The handle 250 may comprise a head coupler 252, a shaft, and a grip 268. The head coupler 252 located at the distal end of the handle 250 may couple to the rake head 200 via the handle bracket 240 on the base plate 205. The grip 268 located at the proximal end of the handle 250 may be adapted to be held by the user. The grip 268 may be padded to increase the user's comfort and may also increase friction between the user's hand and the shaft thereby making it less likely that the shaft will slip from the user's hand.

The handle length 270 may be adjusted by increasing and decreasing the length of the shaft. The shaft may comprise an upper shaft 262, a lower shaft 264, and a telescopic joint 266. The lower shaft 264 may be the distal end of the shaft that couples to the rake head 200. The upper shaft 262 may be the proximal end of the shaft that couples to the grip 268. The upper shaft 262 and the lower shaft 264 may be of different dimensions such that the upper shaft 262 may slide into the lower shaft 264 or vice versa. The telescopic joint 266 may lock the upper shaft 262 to the lower shaft 264 to prevent the handle length 270 from changing. The telescopic joint 266 may unlock to permit the upper shaft 262 to slide relative to the lower shaft 264. As a non-limiting example, the telescopic joint 266 may be a slip joint. In some embodiments, a twisting motion applied to the telescopic joint 266 may lock the lower shaft 264 and the upper shaft 262 together and a twisting motion in the opposite rotational direction may free the lower shaft 264 from the upper shaft 262. In some embodiments, a lever on the telescopic joint 266 may determine whether the lower shaft 264 and the upper shaft 262 are locked or released.

Figure 7:
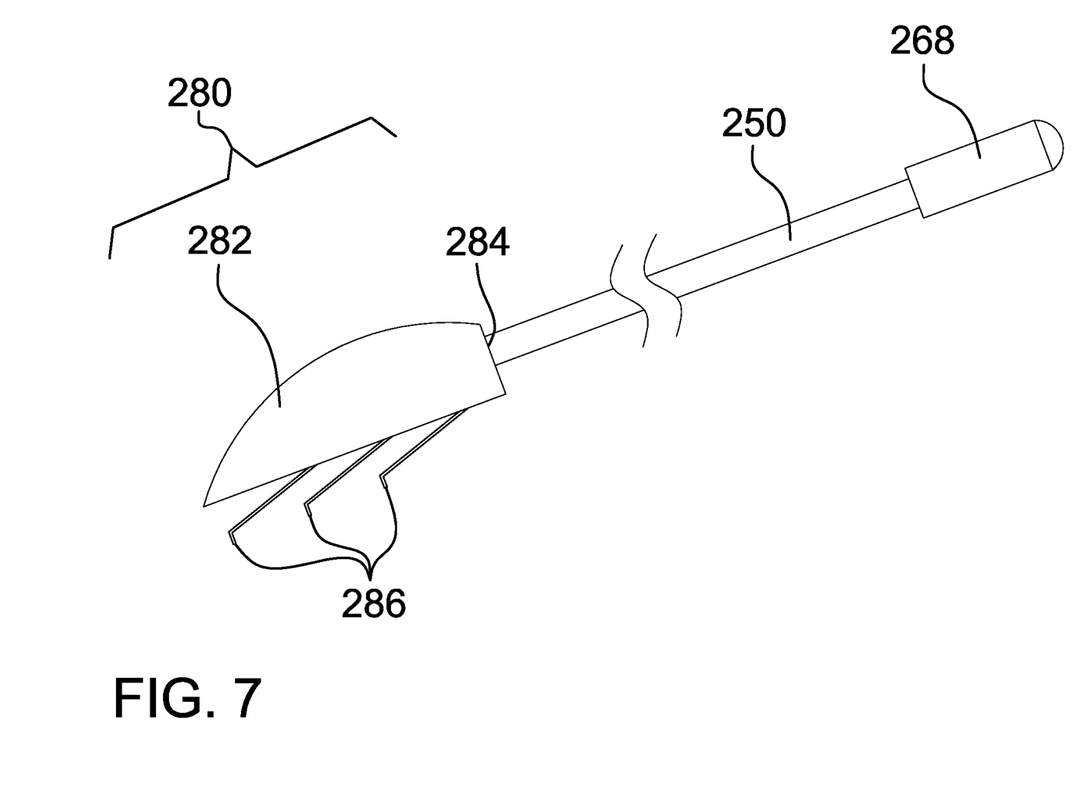
FIG. 7 is a side view of an embodiment of the disclosure illustrating the mini rake attachment.

The mini rake attachment 280 may be an attachment for the distal end of the handle 250. The mini rake attachment 280 may be operable to reach locations where the rake head 200 will not fit. The mini rake attachment 280 may comprise a mini rake head 282 and a plurality of mini rake tines 286. The mini rake head 282 may be a structural support for the plurality of mini rake tines 286. The mini rake head 282 may be physically smaller than the rake head 200. The handle 250 may detachably couple to the mini rake head 282 via a mini rake handler coupler 284. The plurality of mini rake tines 286 may couple to the bottom of the mini rake head 282. The plurality of mini rake tines 286 may be identical to the plurality of tines 210 on the rake head 200 in terms of construction and mounting but may be fewer in number.

In use, a handle 250 may be coupled to a rake head 200 and the rake head 200 may be placed upon ground 910. The handle 250 may be pivoted towards the front or towards the rear depending upon whether a user intends to pull the invention 100 or to push the invention 100. A pair of wheels 230 may contact the ground 910 and the handle 250 may be lifted or lowered until a base plate 205 is parallel to the ground 910. The pair of wheels 230 may support some of the weight of the invention 100 and may establish a travel height 236 for the base plate 205 of the rake head 200. The invention 100 may be repeatedly pushed (or pulled), lifted, and repositioned on the ground 910. As the invention 100 is pushed (or pulled), a plurality of tines 210 may engage with leaves 900 on the ground 910 and may move the leaves 900 along with the rake head 200.

In areas where the rake head 200 may not fit due to an obstruction, the handle 250 may be decoupled from the rake head 200 and coupled to a mini rake attachment 280. The user may pull the leaves 900 away from the obstruction so that the leaves 900 may be collected when the handle 250 is recoupled to the rake head 200.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "axle" may be a cylindrical shaft that is inserted through the center of an object such that the center axis of the object and the center axis of the axle are aligned and the object can rotate using the axle as an axis of rotation.

As used herein, the words "couple", "couples", "coupled" or "coupling", may refer to connecting, either directly or indirectly, and does not necessarily imply a mechanical connection.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, the word "lateral" may refer to the sides of an object or movement towards a side. Lateral directions are generally perpendicular to longitudinal directions. "Laterally" may refer to movement in a lateral direction.

As used herein, "oblique angle" may refer to any angle that is not a right angle or a multiple of a right angle.

As used herein, the word "pivot" may include any mechanical arrangement that allows for rotational motion. Non-limiting examples of pivots may include hinges, holes, posts, dowels, pins, points, rods, shafts, balls, and sockets, either individually or in combination.

As used in this disclosure, "telescopic", "telescoping", and "telescopically" refer to an object made of sections that fit or slide into each other such that the object can be made longer or shorter by adjusting the relative positions of the sections.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A rake comprising:
    a rake head, a handle, and a mini rake attachment;
    wherein a pair of wheels is adapted to support the weight of the rake head and to establish a travel height for the rake head;
    wherein the handle detachably couples to the rake head and is adapted to be held by a user such that the user pushes or pull the rake head over leaves;
    wherein a plurality of tines located on the underside of the rake head force the leaves to move along with the rake head;
    wherein a handle length and an incidence angle of the handle are adjustable;
    wherein the mini rake attachment couples to the handle in place of the rake head;
    wherein the mini rake attachment is operable to move the leaves away from an obstruction where the rake head does not fit;
    wherein the rake head comprises a base plate, the plurality of tines, the pair of wheels, and a handle bracket;
    wherein the base plate is a structural support for the plurality of tines, the pair of wheels, and the handle bracket;
    wherein the plurality of tines are dispersed over the bottom of the base plate;
    wherein an individual tine selected from the plurality of tines is a projection from the bottom of the base plate that is oriented at an oblique angle relative to the base plate;
    wherein the individual tine bends downward at a point that is more than one half of the length of the individual tine away from the base plate.

2. The rake according to claim 1 wherein the plurality of tines are oriented in the same direction.

3. The rake according to claim 2
    wherein the plurality of tines are of uniform length such that the distal end of the individual tines touch ground when the base plate is horizontal to the ground with the pair of wheels resting upon the ground.

4. The rake according to claim 3
    wherein the plurality of tines are organized into two or more rows;
    wherein an individual row selected from the two or more rows is a grouping of the individual tines that are equidistant from the front end of the base plate.

5. The rake according to claim 4
    wherein the individual tines comprising the individual row are dispersed along the individual row with equidistant lateral spacing.

6. The rake according to claim 4
    wherein the two or more rows are staggered such that the individual tines comprising a first row are laterally misaligned compared to the individual tines comprising a second row that is adjacent to the first row.

7. The rake according to claim 4
    wherein the pair of wheels reduces friction between the rake and the ground;
    wherein the pair of wheels establishes the travel height for the base plate;
    wherein the pair of wheels is coupled to the rear of the base plate and rotates around a common rotational axis.

8. The rake according to claim 7
    wherein an axle of each of the pair of wheels is coupled to the base plate;
    wherein the axle is aligned with the common rotational axis.

9. The rake according to claim 8
    wherein the handle bracket couples the handle to the base plate;
    wherein the handle pivots front to rear such that the rake is pushed from behind or pulled from the front.

10. The rake according to claim 9
    wherein the handle is adapted to be held by the user while operating the rake;

wherein the handle comprises a head coupler, a shaft, and a grip;

wherein the head coupler located at the distal end of the handle couples to the rake head via the handle bracket on the base plate;

wherein the grip located at the proximal end of the handle is adapted to be held by the user.

11. The rake according to claim 10 wherein the handle length is adjusted by increasing and decreasing the length of the shaft;

wherein the shaft comprises an upper shaft, a lower shaft, and a telescopic joint;

wherein the lower shaft is the distal end of the shaft that couples to the rake head;

wherein the upper shaft is the proximal end of the shaft that couples to the grip.

12. The rake according to claim 11 wherein the upper shaft and the lower shaft are of different dimensions such that the upper shaft slides into the lower shaft or vice versa.

13. The rake according to claim 12 wherein the telescopic joint locks the upper shaft to the lower shaft to prevent the handle length from changing;

wherein the telescopic joint unlocks to permit the upper shaft to slide relative to the lower shaft.

14. The rake according to claim 13 wherein the telescopic joint is a slip joint.

15. The rake according to claim 13 wherein a twisting motion applied to the telescopic joint locks the lower shaft and the upper shaft together and a twisting motion in the opposite rotational direction frees the lower shaft from the upper shaft.

16. The rake according to claim 13 wherein a lever on the telescopic joint determines whether the lower shaft and the upper shaft are locked or released.

17. The rake according to claim 13 wherein the mini rake attachment is an attachment for the distal end of the handle;

wherein the mini rake attachment is operable to reach locations where the rake head will not fit;

wherein the mini rake attachment comprises a mini rake head and a plurality of mini rake tines;

wherein the mini rake head is a structural support for the plurality of mini rake tines.

18. The rake according to claim 17 wherein the handle detachably couples to the mini rake head via a mini rake handler coupler;

wherein the plurality of mini rake tines couple to the bottom of the mini rake head;

wherein the plurality of mini rake tines are identical to the plurality of tines on the rake head in terms of construction and mounting but are fewer in number.

* * * * *